United States Patent [19]

Tamura

[11] Patent Number: 5,490,242
[45] Date of Patent: Feb. 6, 1996

[54] DOCUMENT PRODUCING DEVICE WITH PROCESSING FOR IDENTICAL DATA BLOCKS

[75] Inventor: Hiroshi Tamura, Fujisawa, Japan

[73] Assignee: Ricoh Company, Ltd., Tokyo, Japan

[21] Appl. No.: 348,160

[22] Filed: Nov. 28, 1994

Related U.S. Application Data

[63] Continuation of Ser. No. 850,851, Mar. 13, 1992, abandoned.

[30] Foreign Application Priority Data

Mar. 13, 1991 [JP] Japan ................................ 3-072088

[51] Int. Cl.⁶ ............................................. G06F 7/00
[52] U.S. Cl. ....................... 395/145; 395/146; 395/149
[58] Field of Search ............................... 395/145, 146, 395/147, 148, 149, 161

[56] References Cited

U.S. PATENT DOCUMENTS

| | | | |
|---|---|---|---|
| 4,951,233 | 8/1990 | Fujiwara et al. | 395/147 X |
| 4,953,108 | 8/1990 | Kato et al. | 395/147 |
| 5,179,650 | 1/1993 | Fukui et al. | 395/147 X |
| 5,208,905 | 5/1993 | Takakura et al. | 395/145 X |
| 5,261,040 | 11/1993 | Suzuki | 395/145 X |

OTHER PUBLICATIONS

Eric Alderman & Michelle Pfister (Wordperfect 5.0), 1989, pp. 3, 136–140 & 116–127.

Recommendation T.501 of International Telegraph and Telephone Consultative Committee; "A Document Application Profile MM for the Interchange of Formatted Mixed Mode Document".

*Primary Examiner*—Mark K. Zimmerman
*Assistant Examiner*—Cliff Nguyen Vo
*Attorney, Agent, or Firm*—Oblon, Spivak, McClelland, Maier & Neustadt

[57] ABSTRACT

A document with document information is produced. Whether some blocks of a plurality of the document information are the same as each other is judged. Document data with at least one block of the some blocks of the document information judged to be the same as each other and at least one block of the document information other than those judged to be the same is produced.

14 Claims, 5 Drawing Sheets

| | |
|---|---|
| PROFILE INFORMATION | P |
| BLOCK INFORMATION | B9 |
| DITTO | B10 |
| CONTENT INFORMATION | C5 |
| DITTO | C6 |
| DOCUMENT INFORMATION | D |
| PAGE INFORMATION | P1 |
| BLOCK INFORMATION | B1 |
| DITTO | B2 |
| DITTO | B3 |
| DITTO | B4 |
| PAGE INFORMATION | P2 |
| BLOCK INFORMATION | B5 |
| DITTO | B6 |
| DITTO | B7 |
| DITTO | B8 |
| CONTENT INFORMATION | C1 |
| DITTO | C2 |
| DITTO | C3 |
| DITTO | C4 |

Rows P through C6: GENERIC INFORMATION
Rows D through C4: SPECIFIC INFORMATION

DOCUMENT PRODUCING DEVICE WITH PROCESSING FOR IDENTICAL DATA BLOCKS

This application is a continuation Ser. No. 07/850,851, filed on Mar. 13, 1992, now abandoned.

BACKGROUND OF THE INVENTION

1. Field of the Invention

The present invention relates to a document producing apparatus and method for producing mixed mode documents, to be transmitted by means of telematic terminals.

2. Discussion of the Background

CCITT (International Telegraph and Telephone Consultative Committee) refers to such communication media as facsimile, teletex, videotex, etc. as being telematic services. Also, CCITT has issued recommendations regarding each of these services. A mixed mode is one communication mode of the telematic services, which mixed mode is used in a class 3 G4 facsimile.

In this mixed mode, blocks of document information (these will be referred to as 'blocks' hereinafter) comprising blocks of character information such as letters and blocks of image information such as figures can be mixed in one document. The blocks of character information are transmitted by means of code information. On the other hand, the blocks of image information are transmitted by means of raster information of bit maps. This document structure of the mixed mode is prescribed in the CCITT recommendation T. 501. This recommendation T. 501 was issued at the IXth general meeting of CCITT held in November, 1988.

Such a mixed mode document as mentioned above is produced by a document producing apparatus which is exclusively used for the mixed mode documents. When producing a mixed mode document, first, an operator forms a block area of a requested size on an indicating screen of the apparatus. Next, the operater inputs requested letters, figures, and so on into the screen. The operator produces one document by repeating the above mentioned operations for each block which composes the document.

Normally, some blocks of figures, letters and so on as logograms of company trade marks and so on, which blocks are the same as each other, are used in one document in some cases. In these cases, the generic layout structure which is a document structure of the mixed mode document is prescribed in the recommendation.

In the generic layout structure, the above mentioned blocks of letters, figures and so on in one document, which blocks are the same as each other, are classified into the generic (meaning being having common elements) information, which serves as a first information. This classification is referred to as the generic designation in the following description herein. By means of the generic designation, data transmission of the blocks designated as the generic information can be executed by transmission of one block of the blocks. Then by producing the mixed mode document by means of using the generic layout structure, data quantity of the document can be reduced, and thus effective data transmission of the document can be realized.

In a case where a document using the generic layout structure is produced by the document producing apparatus, the operator judges whether some blocks of a plurality of blocks of letters, figures and so on are the same as each other. Then the operator has to carry out the generic designation of these blocks judged to be the same.

The problems regarding the above mentioned conventional document producing apparatus will be described below. The judgement whether some blocks, which blocks compose the document, are the same as each other, is carried out while the screen of the apparatus is being observed, and then the generic designation of the blocks judged to be the same is carried out. The above mentioned process for the generic designation is troublesome. Also, an operator who doesn't have knowledge about the generic layout structure can not produce a document using the generic layout structure.

SUMMARY OF THE INVENTION

A general object of the present invention is to solve the above mentioned problems and to provide a document producing apparatus and method by which any operator can produce a document using the generic layout structure.

A more particular object of the present invention is to provide a document producing apparatus and method in which documents with document information are produced, in which it is judged whether some blocks of a plurality of blocks of the document information are the same as each other, and in which document data with at least one block of some blocks judged to be the same and at least one block other than the blocks judged to be the same are produced.

Another object of the present invention is to provide a document producing apparatus and method, in which the blocks judged to be the same and the at least one block other than the blocks judged to be the same are classified.

Still another object of the present invention is to provide a document producing apparatus and method, in which the above operations performed by the apparatus and methods of the present invention are carried out for one of character information and image information.

A still further object of the present invention is to provide a document producing apparatus and method, in which, respectively, document information is inputted, document data is produced as mentioned above, and then the produced document data is outputted.

A further particular object of the present invention is to provide a document producing apparatus and method, in which, respectively, information of operation sequences for producing documents data as mentioned above is stored, data such as that regarding the above mentioned operations is temporarily stored, image information of document information for inputting is read, the document information and directing information of document producing operations by means of the external operations are inputted, the produced document information is printed out and indicated, the inputted document information is edited in a prescribed manner, the edited document information then is converted into document data such as that for data transmission, the document data is stored, a specification of a scanning pattern of image information is adjusted as required, the document data is compressed for transmission, received document data is expanded for restoring to the original state, the document data is transmitted and received by means of information transmission means and data is transferred mutually in between means such as those used in the document producing apparatus and method.

A still further object of the present invention is to provide a document producing apparatus and method in which, such document information as image information, character information and so on is inputted, document is produced, the produced document is indicated, whether inputting and indicating of one block of the document information is completed is judged, further inputting of document information and indicating of a produced document being carried out if such inputting and indication has not been completed yet, and the block produced at this time (this block will be referred to as a 'new block' hereinafter) is compared with the block already produced (this block will be referred to as an 'old block' in hereinafter), if it has not been completed, whether the new block is the same as the old block is judged, the block is classified into first information if it is judged to be the same as the old block, this classifying result is then indicated, the block is classified into second information if it is judged not to be the same as the old block, whether next block of the document information is produced is judged, document information is inputted and the produced document is indicated if it is judged to be produced, and the document comprising of the old block and new block is converted into document data of a prescribed format if it is judged not to be produced any more.

By means of the present invention, an operator does not need to judge whether some blocks of a plurality of the blocks of the document information in the document are the same as each other, and thus a document such as one using the generic layout structure can be easily produced, which structure comprises the above mentioned first information.

Further objects and features of the present invention will be clarified by referring to the following description and the accompanying drawings.

DESCRIPTION OF THE PREFERRED EMBODIMENT

The preferred embodiment according to the present invention is described herein below in detail, with reference to the accompanying drawings.

Figure 1:
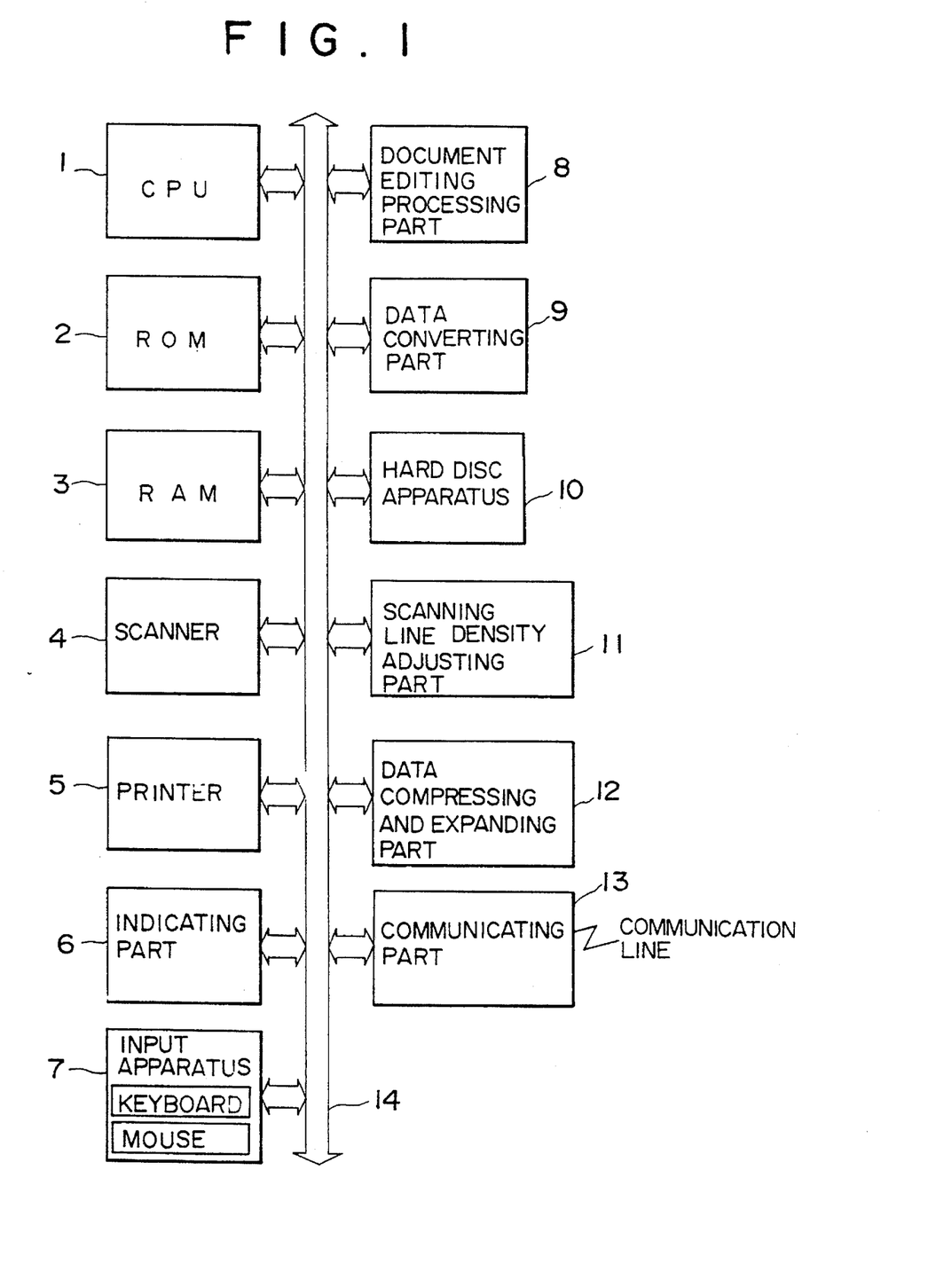
FIG. 1 is a functional block diagram of a mixed mode document transmission apparatus (this apparatus will be referred to as a 'transmission apparatus' hereinafter) according to the present invention.

In FIG. 1, CPU (central processing unit) 1 supervises and controls the whole transmission apparatus. ROM (read only memory) 2 stores controlling programs and so on for the operation of the CPU 1. RAM (random access memory) 3 is a memory for the operation of the transmission apparatus that temporarily stores each kind of data. A scanner 4 reads draft image information which is to be supplied to the transmission apparatus. A printer 5 prints out the produced documents. An indicating part 6 is an indicating apparatus, such as a CRT (cathod ray tube) monitor and so on, which indicates the produced documents. An input apparatus 7 is, for example, a keyboard or a mouse, by which an operator inputs letter information and directions in the operation of the transmission apparatus or points out coordinates on the screen of the transmission apparatus.

A document editing processing part 8 edits inputted character information and image information into a prescribed format. A data converting part 9 converts the edited document into document data, which document data is in accordance with CCITT recommendation T.501. This document data is stored in a hard disc apparatus 10.

A scanning line density adjusting part 11 adjusts the scanning line density of raster information as required when image information is being transmitted; for example, the part 11 adjusts the scanning line density into that of the receiving apparatus, to which the raster information is transmitted, which receiving apparatus has a different line density specification from that of the transmission apparatus before the adjusting by the part 11. A data compressing and expanding part 12 compresses the data of raster information to be transmitted, and expands the data of received raster information for restoring to the original state. A communication part 13 transmits and receives the documents by means of a digital line network such as ISDN (International Service Digital Network). Each of the above mentioned parts sends to and receives from each other each kind of controlling signal or data by means of a system bus 14.

Due to the above construction of the transmission apparatus, the apparatus can produce mixed mode documents and also transmit and receive the document data.

To produce a document, an operator sets the transmission apparatus into the document producing mode, and then he, one by one, produces every block, having the required contents of the document on the screen of the indicating part 6 by the prescribed operations.

That is, at first, the operator designates a block area on the screen by means of the mouse of the input apparatus 7. Next, the operator writes sentences on the block area by a keyboard operation or he writes a draft image there, which image was read by means of the scanner 4. By means of the above mentioned input process, one block is completed, then the operator informs the transmission apparatus of the completion of this one block by means of a keyboard operations.

Figure 2:
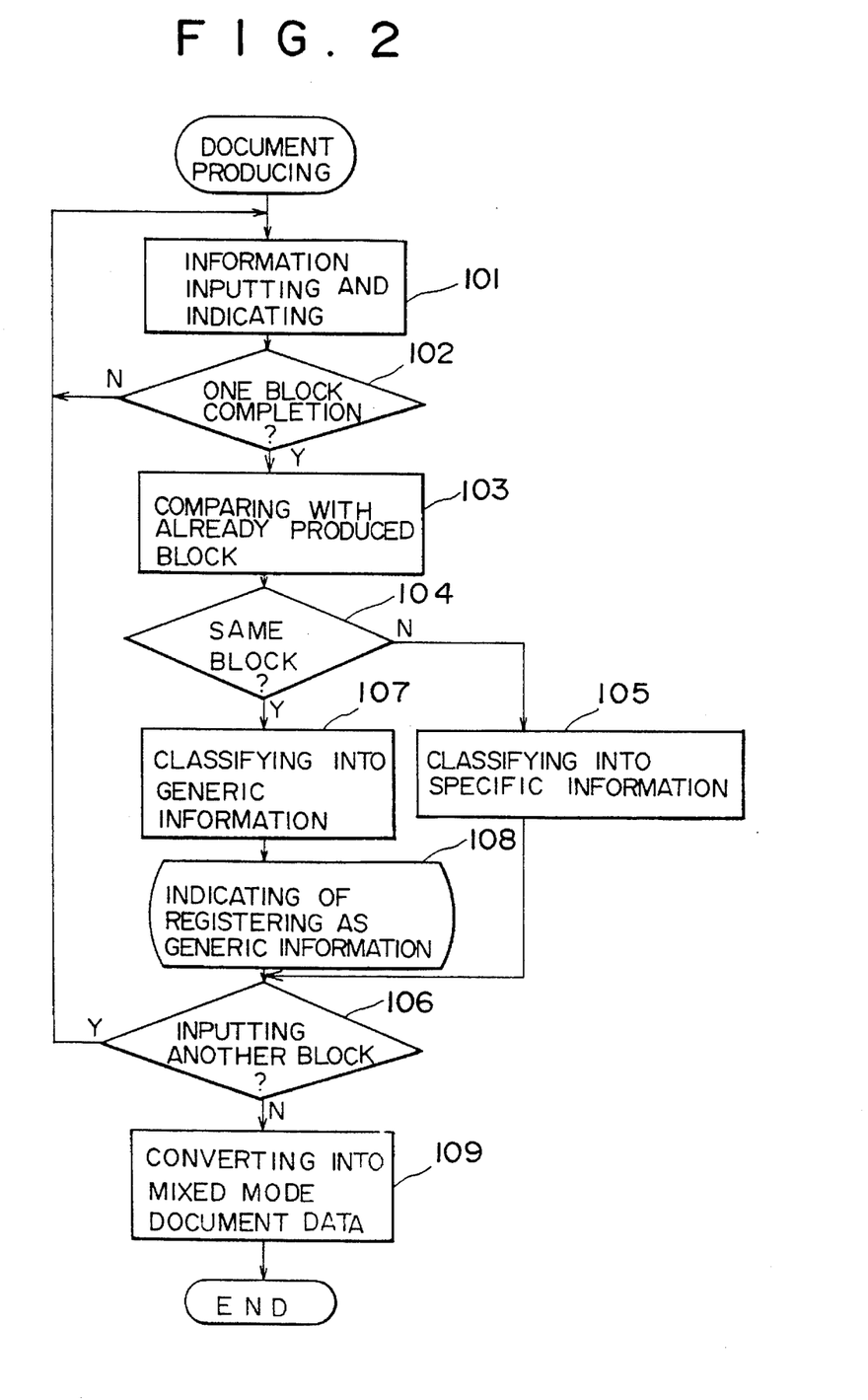
FIG. 2 is an operation flow chart of a document producing process of the transmission apparatus according to the present invention.

A detailed description of the above mentioned process is given below. The transmission apparatus reads such document information as character information and image information applied to the transmission apparatus by means of the input step mentioned above, then the transmission apparatus produces a document with the document information and indicates the document on the screen of the transmission apparatus as shown in FIG. 2. That is, the transmission apparatus executes a step 101, and then executes a judging step 102. The transmission apparatus continues to execute the step 101 until the result of the judging step 102 becomes Yes, that is, until the input step for one block is completed. The transmission apparatus alternately executes the step 101 and the judging step 102 until the input step for one block is completed.

Figure 4:
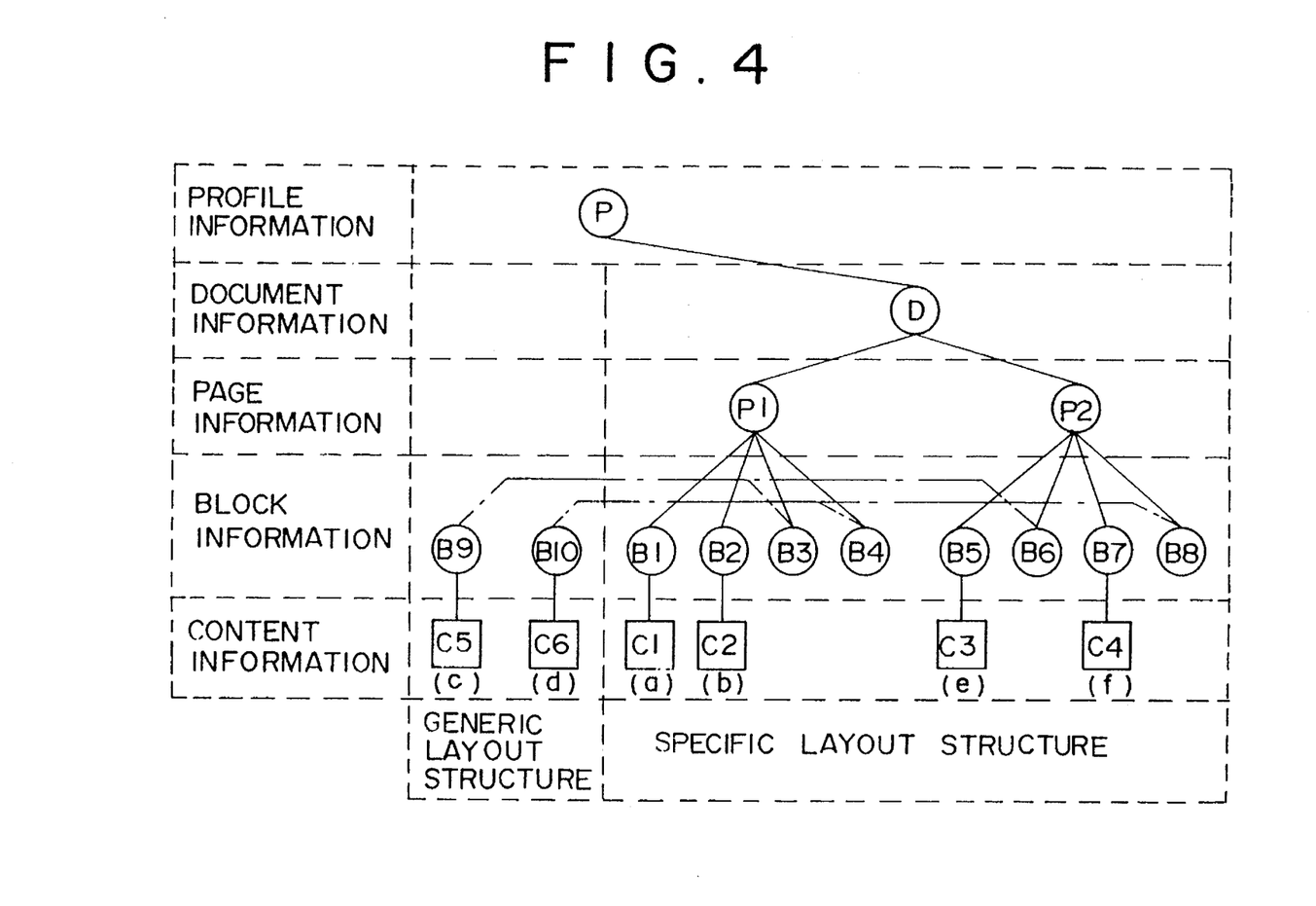
FIG. 4 shows the hierarchic structure of document data produced by the transmission apparatus according to the present invention.

When the input step for one block (Yes in the judging step 102) has been completed, the transmission apparatus indicates a message on the screen showing that the input step for one block of document information has been completed. Next, the transmission apparatus compares the contents of the one new block of the document information with the contents of the old blocks of the document information stored in the RAM 3 or the hard disc apparatus 10. Next, the transmission apparatus judges whether these blocks of document information are the same as each other (step 103). If the first block of document information is produced in the transmission apparatus, there is no old block, that is, no old block the same as the new block. Thus, the result of a judging step 104 is No. And then the transmission apparatus discriminates the new block so as to classify it into specific information serving as a second information (step 105). If a block of the document information was discriminated as the specific information, the block has the specific layout structure when the produced document, including the specific information, is converted to document data, which data is in accordance with CCITT recommendation T.501. The specific layout structure is shown in FIG. 4.

When the operator is to produce another new block of the document information after producing the first block, the operator informs the transmission apparatus by means of the keyboard operations that an another new block of the document informaton is going to be produced. Then the operator produces another new block on the screen of the transmission apparatus by the above mentioned step 101.

That is, after the operator has informed the transmission apparatus that another new block is going to be produced, that is, result Yes in the judging step 106, the transmission apparatus executes the input step 101 again for the new block. Then after completion of the producing of the new block (Yes in the judging step 102), the transmission apparatus compares the contents of the new block with the contents of old blocks in the transmission apparatus. In this case, the transmission apparatus compares whether the blocks have the same dimensions, same kind of information, that is, character information or image information and same data contents (the step 103). When the new block is different from the old blocks as regards at least one of the above items (No in the judging step 104), the transmission apparatus discriminates the new block so as to classify it into the specific information as mentioned above (the step 105).

Figure 3:
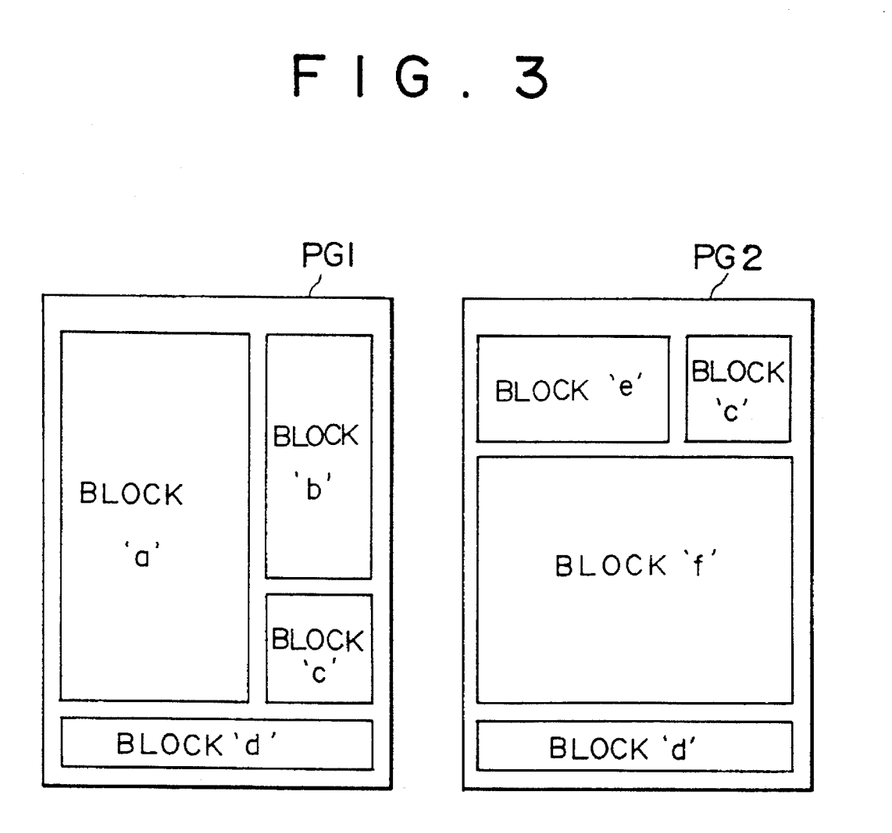
FIG. 3 shows an example of a document produced by the transmission apparatus according to the present invention.

For example, if the operator is to produce two document pages PG1, PG2 as shown in FIG. 3, then he produces four (4) blocks 'a' to 'd' in the first page PG1. Further, the operator produces four (4) blocks 'e', 'c', 'f' and 'd' in the second page PG2. The block 'c' of PG1 and the block 'c' of PG2 are the same regarding all of the above mentioned items in regard to which the blocks are compared. The block 'd' of PG1 and the block 'd' of PG2 are also the same regarding the same items.

When each of the new blocks 'a' to 'f' has been produced, the transmission apparatus judges whether or not there is any old block the same as each of the new blocks (the judging step 104). If the result of the judging is that there is at least one block the same as at least one of the new blocks (Yes of the judging step 104), the transmission apparatus discriminates the new block so as to classify it into generic information, serving as a first information (step 107). If a block was classified into the generic information, the block has the generic layout structure when the produced document is converted to document data, which is in accordance with CCITT recommendation T.501 (step 109). This generic layout structure is shown in FIG. 4.

Next, the transmission apparatus indicates, for example, a guidance message, by means of the indicating part 6, showing that there is at least one old block the same as the new block. Then this new block is registered as the generic information (step 108).

When the operator has completed producing all of the blocks of the document information in the transmission apparatus, he informs the transmission apparatus that producing for all the blocks has been completed by means of a keyboard operation.

When the operator has informed the transmission apparatus that the producing of the all blocks of the document information had been completed, that is, no other new block will be supplied with input (No in the judging step 106), the transmission apparatus converts the produced document, which is composed of the above mentioned blocks, into a document data, which data is in accordance with CCITT recommendation T.501 (the step 109). This document data is composed of profile information, document information, page information, block information and content information.

FIG. 4 shows a hierarchic structure of document data converted by the data converting part 9, which data concerns the example shown in FIG. 3. That is, in this case, the profile information item P contains information showing that a document is composed of two kinds of data layout structures, that is, the generic layout structure and the specific layout structure. The document information item D contains information showing that this document is a mixed mode document, having two pages, etc. The page information contains information showing that the blocks 'a' to 'd' of the first page PG1 shown in FIG. 3 correspond to block information items B1 to B4 respectively, and showing that the blocks 'e', 'c', 'f' and 'd' of the second page PG2, also shown in FFIG. 3, correspond to block information items B5 to B8 respectively.

The block information item B1 contains a kind of information, position and dimensions of the corresponding block 'a' and B1 also contains information showing that the actual contents of the block 'a' are contained in content information item C1, etc. The above mentioned kind of information is character information or image information. The content information item C1 contains the actual contents of character information or image information of the block 'a'.

Similar to the above mentioned information for the block information item B1, the block information items B2, B5 and B7 contain all of the above mentioned information corresponding to the blocks 'b', 'e' and 'f' respectively, and also the block information items B2, B5 and B7 also contain information showing that the actual contents of the blocks 'b', 'e' and 'f' are contained in the content information items C2 to C4, respectively. The content information items C2 to C4 contain the actual contents of the blocks 'b', 'e' and 'f'.

All of the above mentioned information belongs to the specific information, and the specific information has the specific layout structure as mentioned above.

On the other hand, the block information items B9, B10 and content information items C5, C6, which correspond to B9, B10 respectively, has the generic layout structure. The block information item B9 contains a kind of information and dimensions regarding the block 'c' and the information item B9 also contains information showing that the actual contents of the block 'c' are contained in the content information item C5. Similar to the above, the block information item B10 contains a kind of information and dimensions of the block 'd' and the information item B10 also contains information showing that the actual contents of the block 'd' was contained in the content information item C6.

The block information item B3 contains the position of the block 'c' in the first page PG1, and B3 also contains information showing that with regard to the information regarding the block 'c' of PG1 other than that contained in B3, the block information item B9 has to be referred to. The block information item B6 contains the position of the block 'c' in the second page PG2 is contained, and similar to the above, B6 also contains information showing that with regard to the information regarding the block 'c' of PG2 other than that contained in B6, the block information item B9 has to be referred to.

The block information items B4 and B8 respectively contain the position of the block 'd' in pages PG1 and PG2, B4 and B8 also contain information showing that with regard to the information regarding the block 'd' of PG1 and PG2, the block information item B10 has to be referred to respectively. The block information item B10 has to be referred to so as to obtain the other information regarding B4 and B8.

Figure 5:
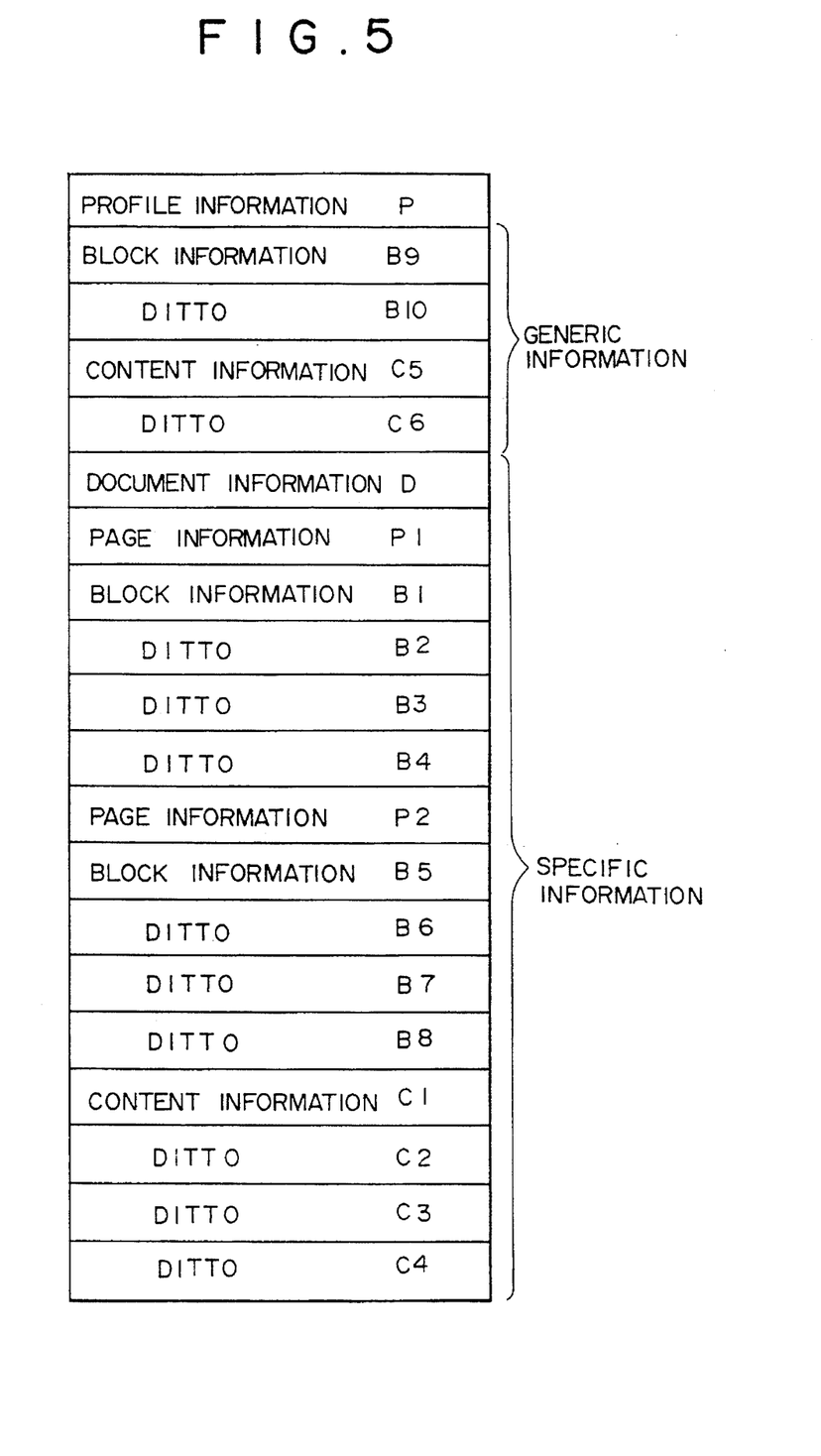
FIG. 5 is an information composition drawing of a document file in which the produced document data is stored.

Each of the above mentioned information items is stored in the hard disc apparatus 10 of the transmission apparatus in such a manner as to form a document file of a prescribed format. FIG. 5 shows an information storing sequence, in which the informaton is stored therein. In the sequence, respectively, profile information item P is stored first, the generic information is stored after the information P stored, then the specific information is stored after the generic information stored, in the hard disc apparatus 10. Regarding the generic information, block information items B9 and B10 are stored successively, then content information items C5, C6 are stored successively. Regarding the specific information, document information is stored first, then the information of the first page PG1 and that of the second page PG2 are stored successively. Regarding the information of the PG1, the page information item P1, the block information items B1 to B4 and the content information items C1, C2 are stored successively. Regarding the information of the PG2, the page information item P2, the block information items B5 to B8 and the content information items C3, C4 are stored successively.

Thus, the document data is produced and then stored in the hard disc apparatus 10 (step 109).

When the operator is to transmit the produced document data, he designates a prescribed address to which the data is to be transmitted into the transmission apparatus by means of a prescribed keyboard operation. Next, he designates the document data which is to be transmitted. By means of these steps, the transmission apparatus outputs the designated document data and then it transmits the document data to the receiver. When the document shown in FIG. 3 is transmitted from the transmission apparatus, each of the information items, which compose the document data, is outputted by the sequence shown in FIG. 5.

Summarizing the above mentioned description, in the transmission apparatus, that is, in the preferred embodiment of the present invention, the transmission apparatus compares whether the contents of the new block of the document information are the same as those of the old block of the document information each time the operator produces a block of the document information. Then, the transmission apparatus classifies the block judged to be the same as the old block into the generic information, and the block other than that judged to be the same into the specific information, respectively. When the producing of the document has been completed, the transmission apparatus produces the mixed mode document data in such a manner that each of the blocks of the document information is separated into the generic information or the specific information in accordance with the result of the classification. Thus, the transmission apparatus produces mixed mode document data, which is comprised of these blocks of the document information.

The operation described below, needed for producing the document having the generic layout structure in the conventional apparatus, is not needed in the embodiment of the present invention. The operation judges whether the blocks on the screen of the transmission apparatus are the same as each other, then classifies the blocks judged to be the same into the generic information and so on. Thus, the document, having the generic layout structure, can be produced easily by anyone.

Further, the above mentioned embodiment can have such a function that during the producing of a document, the transmission apparatus shows the blocks classified up to this time into the generic information, or classified information, that is, the result of the classification, on the screen. Thus the operator designates a required one of the blocks classified into the generic information on the screen by means of a prescribed keyboard operation or mouse operation, so that the designated block will be inserted into the required position of the page of the document, which page is produced at this time and shown on the screen. By means of the above mentioned function, the producing of the document having some blocks the same as each other can be carried out easily.

Further, in the above mentioned embodiment, the transmission apparatus judges whether a new block of the document information is the same as an old block of the document information each time the operator produces a block of the document information. However, the transmission apparatus may have such a function that the judging as to whether some of the blocks of the document information are the same as each other is carried out when the operator has completed the producing of all of the blocks.

In the above mentioned embodiment, attributes, which are contained in the document information item D, page information items P1, P2 and block information items B1 to B10, shown in FIG. 4, are in accordance with Table 1 of CCITT recommendation T.501.

With regard to the document information and page information, the attributes contained therein are an object type, an object identifier, a subordinate, an user readable comments and a default value lists, all of which belong to shared attributes. These five attributes are contained in the document informaton item D and page information items P1, P2 when the corresponding blocks of the document information belong to the specific information. Further, with regard to the page information items P1, P2, dimensions, which belong to layout attributes, are added to all of the above mentioned five attributes. This attribute is contained in the page information items P1, P2 when the corresponding blocks of the document information belong to the specific information. It is mandatory that the object type, the object identifier and the subordinate are contained in the corresponding information respectively. This condition of the attributes is referred to as a 'mandatory condition' hereinafter. The user readable comments and the dimensions are regarded as if certain prescribed contents were contained in the above information when nothing was contained therein respectively. This condition of the attributes is referred to as a 'defaultable condition' hereinafter. The above mentioned defaultable value lists do not have to be contained in the corresponding information. This condition of the attributes is referred to as a 'non mandatory condition' hereinafter.

With regard to the block information, the object type has the mandatory condition in the block information, when the corresponding block of the document information belongs to the specific information or the generic information. The object identifier has the mandatory condition in the above information when the corresponding block of the document information belongs to the specific information. Further, the object class identifier has the mandatory condition in the above information when the corresponding block of document information belongs to the generic information. the object class has the non mandatory condition in the above information when the corresponding block of the document information belongs to the specific information. Further, the presentation attributes have the non mandatory condition in the above information when the corresponding block of the document information belongs to the generic information, and the presentation attributes have the defaultable condition therein when the corresponding block of the document information belongs to the specific information. The content portion has the non mandatory condition in the information when the corresponding block of the document information belongs to the generic information or the specific information. The user readable comments have the non mandatory condition in the information when the corresponding block of the document information belongs to the generic information, and the user readable comments have the defaultable condition in the information when the corresponding block of the document information belongs to the specific information. These last 7 attributes belong to the shared attributes. Further, the dimensions and position, both belong to the layout attributes, and both have the non mandatory condition in the information when the corresponding block of the document information belongs to the generic information, and both have the defaultable condition in the information when the corresponding block of the document information belongs to the specific information.

The contents of the above mentioned attributes will be described below. The object class shows the discrimination of the document information, the page information or the block information. The object identifier contains, for example, in FIG. 4, data corresponding to the referece numbers P1, P2 regarding the page information items P1, P2; reference numbers B1 to B8 regarding the block information, respectively, etc. The object class identifier is contained in only the block information, when the corresponding block of the document information belongs to the generic information, for example, in FIG. 4, data corresponding to reference numbers B9, B10 is contained in the object class identifier. In the object class, information for referring to the generic information from the specific information is contained, that is, for example, in FIG. 4, data corresponding to reference numbers B9, B10 are contained regarding B3, B4 respectively. In the subordinates, the number of information items belonging to the subordinate position thereto in the hierarchic structure shown in FIG. 4 is contained. That is, for example, in FIG. 4, the number two of the page information items P1, P2, which information items are located subordinate to the document information item D is contained in the document information item D; the number four of the block information items B1 to B4, which are located subordinate to the page information item P1 is contained in the page information item P1.

Attributes contained in the presentation attribute will be described later. In the content portion of each of the block information items, data corresponding to reference number regarding each of the content information items is contained. That is, for example, in FIG. 4, the content information items C1 to C6 are contained in the block information items B1, B2, B5, B7, B9, B10 respectively. The user readable comments are any comment written as required. In the default value lists, the information of the defaultable condition regarding the information items located subordinate thereto in the hierarchic structure shown in FIG. 4 are contained.

In the dimensions of the layout attributes, dimensions of each block of the document information are contained. In the position thereof, a position of an area occupied by the block of the document information arranged at each page is contained.

Among all of the above mentioned attributes, the presentation attributes, the user readable comments and dimensions information will be compared in step 103 shown in the operation flow chart of FIG. 2 so as to judge whether some of blocks of the document information are the same as each other.

The attributes contained in the presentation attributes are described below. These attributes are in accordance with Table 5 of CCITT recommendation T.501. The attributes are: a content architecture class; a character path, a line progression, a character orientation, an initial offset, graphic character sets, a character spacing, a line spacing, an alignment and a raphic rendition, these last 9 attributes belonging to character attributes; and pel path, line progression, pel spacing and initial offsets, these last 4 attributes belonging to raster graphic attributes.

In the content architecture class, the discrimination of character information or raster information (image information) and so on are contained. In the character path and the line progression of the character attributes, the progressing directions of letters and lines of letters respectively are contained. In the character orientation, the incline angle of each of letter is contained. In the initial offset, relative position where a letter is written first in the area occupied by the block of the document information is contained. In the graphic character sets, discrimination of, for example, Japanese letters, English letters or other language letters is contained.

A dimension unit of character spacing and line spacing is SMU, that is, (1/200) inch. In the graphic rendition, ornamenting ways of letter shape for emphasizing it are contained.

In the pel path of raster graphic attributes, progressing direction of picture elements is contained. In the line progression, the progressing direction of the scanning line is contained. In the pel spacing, the transmission speed of picture elements from the transmission apparatus is contained, for example, 4 SMU, which corresponds to 2400 DPI (dot/inch).

Next, attributes contained in the content portion, which are comprised of the content information, will be described below. These attributes are in accordance with Table 7 of CCITT recommendation T.501. The attributes are: a content portion identifier and a type of coding, these 2 attributes having the mandatory condition in the content information; a number of pels per line, it having the mandatory condition in the information, a compression, it having the defaultable condition in the information, an alternative representation, it having the non mandatory condition in the information, a content information, it having the mandatory condition in the information, these last 4 attributes belonging to raster graphic coding attributes.

In the content portion identifier, data corresponding to reference number of the content information, for example, in FIG. 4, data corresponding the content information items C1 to C6 are contained. In the type of coding, discrimination of character information or image information is contained. When the corresponding block of the document information belongs to image information, for example, the manner of compression at the time of data transmission and so on are also contained in the type of coding. In the number of pels per line of raster graphic coding attributes, the number of picture elements is contained, a unit of the number being dot/inch. The alternative representation contains prescribed information to be shown when the error of decoding occurs at the time of decoding of the document information. In the contents of information, the actual contents of the block of the document information are contained.

Among the above mentioned attributes of which the content portion is comprised, the type of coding, the number of pels per line, the compression, the alternative representation and the content information will be compared in the step 103 shown in the operation flow chart of FIG. 2 so as to judge whether some of the blocks of the document information are the same as each other.

All the above mentioned information is stored in the hard disc apparatus 10 according to the sequence shown in FIG. 5. Therefore the comparing in step 103 shown in the operation flow chart of FIG. 2 is carried out regarding the block information and then regarding the content information.

Further, the present invention is not limited to the above described embodiments, and variations and modifications may be made without departing from the scope of the present invention.

What is claimed is:

1. A document producing apparatus comprising:

a document producing means for producing a document with document information formed of a plurality of blocks;

a judging means for evaluating each of the plurality of blocks after each of the plurality of blocks is formed, by comparing the plurality of blocks to one another, for judging whether at least two blocks of the plurality of blocks of said document information are the same as each other; and a document data producing means for producing document data of first information of the at least two blocks of said document information judged to be the same as each other by said judging means and second information of at least one block of said document information other than the at least two blocks judged to be the same by said judging means.

2. A document producing apparatus according to claim 1, wherein said document producing means produces said document with at least one of character information and image information.

3. A document producing apparatus according to claim 1, further comprising:

a document information inputting means for inputting said document information from an external device, which information is used for producing said document;

an executing means for executing operation of said document producing means, judging means and document data producing means; and a document data outputting means for outputting said document data.

4. A document producing apparatus according to claim 1, wherein said document data comprises:

page information designating a position of at least one block of said document information in at least one page of said document, block information designating contents of at least one designated block of said document information, so that said contents correspond to said position designated by said page information, and content information comprising actual contents of said designated block of said document information.

5. A document producing apparatus according to claim 1, wherein said document data comprises:

profile information indicating that said document data comprises said first information and second information, document information indicating that said document information includes character information and image information and indicating a number of pages of said document, page information designating a position of at least one block of said document information in said page of said document, block information designating contents of at least one designated block of said document information, so that said contents correspond to said position designated by said page information, and content information comprising the actual contents of said designated block of said document information.

6. A document producing apparatus comprising:

a document producing means for producing a document with document information formed of a plurality of blocks;

a judging means for evaluating each of the plurality of blocks after each of the plurality of blocks is formed, by comparing the plurality of blocks to one another, for judging whether at least two blocks of the plurality of blocks of said document information are the same as each other;

a document data producing means for producing document data of first information of the at least two blocks of said document information judged to be the same as each other by said judging means and second information of at least one block of said document information other than the at least two blocks judged to be the same by said judging means;

an executing means for executing operations of said document producing means, judging means and document data producing means;

an operating sequence storing means for storing operation sequence information for said executing means;

a temporary storing means for temporarily storing data regarding operation of said document producing apparatus;

an external operation inputting means for inputting document information for document producing and inputting directing information regarding an operation executed by said executing means;

image information reading means for reading image information so as to input the image information to the external operation inputting means;

a printing out means for printing out said produced document;

an indicating means for indicating the contents of said produced document;

an editing means for editing said inputted document information into a prescribed format;

a data converting means for converting said document information, edited by said editing means, into said document data for data transmission;

a document data storing means for storing said document data converted by said data converting means;

a scanning pattern adjusting means for adjusting a specification of a scanning pattern of image information at a time of transmission thereof into a required specification;

a data compressing and expanding means for compressing said document data at the time of transmission thereof and expanding received document data for restoring to an original state;

a transmitting and receiving means for transmitting and receiving said document data by means of a prescribed information transmission means; and a data transfer means for transferring data mutually between said executing means, external operation inputting means, image information reading means, printing out means, indicating means, editing means, data converting means, document data storing means, scanning pattern adjusting means and data compressing and expanding means.

7. A document producing method comprising the steps of:

(a) producing a document with document information formed of a plurality of blocks;

(b) evaluating each of the plurality of blocks after each of the plurality of blocks is formed, by comparing the plurality of blocks to one another, for judging whether at least two blocks of the plurality of blocks of said document information are the same as each other; and (c) producing document data of first information of the at least two blocks of said document information judged to be the same as each other by said step (b) and second information of at least one block of said document information other than the at least two blocks judged to be the same by said step (b).

8. A document producing method according to claim 7, wherein said step of (a) comprises a step of (a-1) of producing a document with at least one of character information and image information.

9. A document producing method according to claim 8, further comprising the steps of:

(f) inputting said document information from an external device, which information is used for producing said document;

(g) executing operations of said step (a), step (b) and step (c); and (h) outputting said document data.

10. A document producing method according to claim 7, wherein said step (c) comprises the steps of:

(c-3) producing the actual contents of at least one designated block of said plurality of blocks of said document information, (c-4) designating a position of said designated block of said document information in at least one page of said document, and (c-5) designating said contents of said designated block of said document information, so that said contents correspond to said position designated by said step (c-4).

11. A document producing apparatus according to claim 7, wherein said step (c) comprises the steps of:

(c-3) producing the actual contents of at least one designated block of said plurality of blocks of said document information, (c-4) designating a position of said designated block of said document information in at least one page of said document, (c-5) designating said contents of said designated block of said document information, so that said contents correspond to said position designated by said step (c-4), (c-6) designating that said document information includes character information and image information and designating a number of said pages of said document, and (c-7) designating that said document data comprises said first information and second information.

12. A document producing method comprising the steps of:

(a) producing a document with document information formed of a plurality of blocks;

(b) evaluating each of the plurality of blocks after each of the plurality of blocks is formed, by comparing the plurality of blocks to one another, for judging whether at least two blocks of the plurality of blocks of said document information are the same as each other;

(c) producing document data of first information of the at least two blocks of said document information judged to be the same as each other by said step (b) and second information of at least one block of said document information other than the at least two blocks judged to be the same by said step (b);

(i) executing operations of said step (a), step (b) and step (c);

(j) storing operation sequence information for said step (i);

(k) temporarily storing data regarding operation of said document producing method;

(l) inputting document information for document producing and inputting directing information regarding an operation executed in said step (i);

(m) reading image information so as to input the image information for document producing in step (l);

(n) printing out said produced document;

(o) indicating the contents of said produced document;

(p) editing said inputted document information into a prescribed format;

(q) converting said inputted document information, edited by said step (p), into said document data for data transmission;

(r) storing said document data converted by said step (q);

(s) adjusting a specification of a scanning pattern of image information at a time of transmission thereof into a required specification;

(t) compressing said document data at the time of transmission thereof and expanding received document data for restoring to the original state;

(u) transmitting and receiving said document data; and (v) transferring data mutually between said step (i), step (j), step (k), step (l), step (m), step (n), step (o), step (p), step (q), step (r), step (s), step (t) and step (u).

13. A document transmitting apparatus comprising:

a document producing means for producing a document with document information formed of a plurality of blocks;

a judging means for evaluating each of the plurality of blocks after each of the plurality of blocks is formed, by comparing the plurality of blocks to one another, for judging whether at least two blocks of the plurality of blocks of said document information are the same as each other;

a document data producing means for producing document data of first information of the at least two blocks of said document information judged to be the same as each other by said judging means and second information of at least one block of said document information other than the at least two blocks judged to be the same by said judging means; and transmitting means for transmitting the document of the first and second information.

14. A document transmitting method comprising the steps of:
(a) producing a document with document information formed of a plurality of blocks;
(b) evaluating each of the plurality of blocks after each of the plurality of blocks is formed, by comparing the plurality of blocks to one another, for judging whether at least two blocks of the plurality of blocks of said document information are the same as each other;
(c) producing document data of first information of the at least two blocks of said document information judged to be the same as each other by said step (b) and second information of at least one block of said document information other than the at least two blocks judged to be the same by said step (b); and
d) transmitting the document of the first and second information.

* * * * *